(12) United States Patent
Vallamkondu et al.

(10) Patent No.: US 11,892,469 B2
(45) Date of Patent: Feb. 6, 2024

(54) HEALTH-MONITORING SYSTEM FOR A DEVICE DETERMINING ROTATION FREQUENCY OF A SHAFT

(71) Applicant: Rosemount Aerospace Inc., Burnsville, MN (US)

(72) Inventors: Aswin Kumar Vallamkondu, Karnataka (IN); Magdi A. Essawy, Lakeville, MN (US); Dennis A. Quy, Apple Valley, MN (US); Ramesh Annamareddy, Karnataka (IN)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 17/844,289

(22) Filed: Jun. 20, 2022

(65) Prior Publication Data
US 2022/0404386 A1 Dec. 22, 2022

(30) Foreign Application Priority Data
Jun. 21, 2021 (IN) .............................. 202141027780

(51) Int. Cl.
*G01P 3/48* (2006.01)
*F01D 21/00* (2006.01)
*G01P 3/487* (2006.01)
*G01P 3/489* (2006.01)
*G01P 21/02* (2006.01)

(52) U.S. Cl.
CPC ............ *G01P 3/487* (2013.01); *F01D 21/003* (2013.01); *G01P 3/4805* (2013.01); *G01P 3/489* (2013.01); *G01P 21/02* (2013.01)

(58) Field of Classification Search
CPC ................................. G01P 3/487; G01P 3/489
See application file for complete search history.

(56) References Cited

U.S. PATENT DOCUMENTS 5,717,302 A 2/1998 Sakai et al.
6,633,828 B2 10/2003 Faymon et al.
(Continued)

FOREIGN PATENT DOCUMENTS

DE 102007036202 A1 5/2009
KR 20170112257 A 10/2017

OTHER PUBLICATIONS

Extended European Search Report dated Nov. 15, 2022, pp. 6.

*Primary Examiner* — Reena Aurora
(74) *Attorney, Agent, or Firm* — Kinney & Lange, P.A.

(57) ABSTRACT

Apparatus and associated methods relate to monitoring health of a system for sensing rotational frequency of a rotatable member. A plurality of magnetic speed probes, each of which is configured to sense the rotational frequency of the rotatable member, are arranged in transmissive proximity with one another. A transmitter-configured one of the plurality of magnetic speed probes includes a signal coupler that couples an electrical signal generated by a radio-frequency signal generator into the inductive coil of the transmitter-configured magnetic speed probe, thereby radiatively transmitting an electromagnetic signal. A speed-probe monitor electrically coupled to each of the plurality of magnetic speed probes determines, based on the coil current sensed by each of the plurality of magnetic speed probes in response to the electromagnetic signal radiatively transmitted, health of the system.

20 Claims, 8 Drawing Sheets

(56) References Cited

U.S. PATENT DOCUMENTS

| | | |
|---|---|---|
| 8,796,980 B2 | 8/2014 | Wise et al. |
| 2005/0127905 A1* | 6/2005 | Proctor .................... G01P 3/49 |
| | | 324/207.18 |
| 2011/0277478 A1* | 11/2011 | Jacoby, Jr. .............. F01D 21/02 |
| | | 60/660 |
| 2015/0160254 A1 | 6/2015 | Huynh et al. |
| 2016/0091342 A1 | 3/2016 | Liu et al. |

* cited by examiner

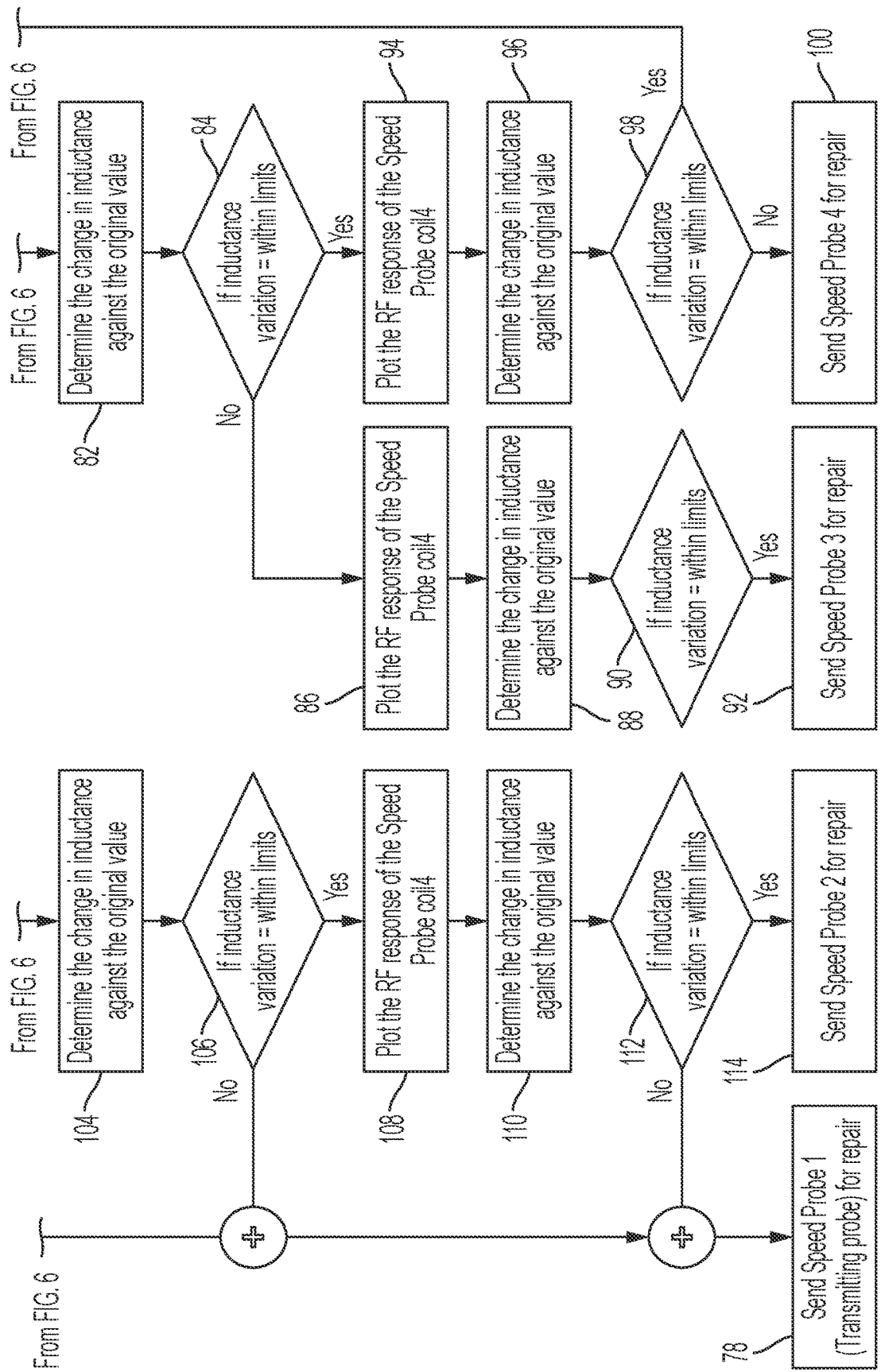

HEALTH-MONITORING SYSTEM FOR A DEVICE DETERMINING ROTATION FREQUENCY OF A SHAFT

BACKGROUND

Magnetic speed sensors are used in a variety of apparatus and for a variety of purposes. Some environments in which a magnetic speed sensor is used can present harsh chemicals, high temperatures, abrasive atmospheres, etc. Such challenging environments can cause degradation of some components of the magnetic speed sensor so situated. For example, aircraft engines can be equipped with such magnetic speed sensors for measuring the rotational speed of a shaft thereof. Such magnetic speed sensors can be exposed to very high temperatures, abrasive and/or reactive elements in the atmosphere where the magnetic speed sensor is located. Behavior of such magnetic speed sensors can change in response to exposure to such a challenging environment.

SUMMARY

Apparatus and associated methods relate to a system for sensing rotational frequency of a rotatable member and for monitoring health of the system. The system includes a radio-frequency signal generator, a plurality of magnetic speed probes and a speed probe monitor. The radio-frequency signal generator generates an electrical signal. The plurality of magnetic speed probes is arranged in transmissive proximity with one another. Each of the plurality of speed probes includes a magnet, and inductive coil, and an electrical current sensor. The magnet generates a magnetic field proximate the rotatable member. Rotation of the rotatable member causes changes in the magnetic field generated by the magnet. The inductive coil is positioned proximate the rotatable member. The electrical-current sensor is coupled to the inductive coil, the electrical-current sensor senses a coil current induced within the inductive coil. A transmitter-configured one of the plurality of magnetic speed probes includes a signal coupler that couples the electrical signal generated by the radio-frequency signal generator into an inductive coil of the transmitter-configured magnetic speed probe, thereby radiatively transmitting an electromagnetic signal. The speed-probe monitor is electrically coupled to each of the electrical-current sensors of the plurality of magnetic speed probes. The speed-probe monitor determines, based on the coil current sensed by the electrical-current sensor of each of the plurality of magnetic speed probes in response to the electromagnetic signal radiatively transmitted by the transmitter-configured magnetic speed probe, health of the system.

Some embodiments relate to a method for a sensing rotation frequency of a rotatable member and for monitoring health thereof. The method includes generating, via a magnet, a magnetic field proximate the rotatable member. The method includes causing, via rotation of the rotatable member, changes in the magnetic field generated by the magnet. The method includes positioning a plurality of inductive coils proximate the rotatable member so as to sense changes in the magnetic field. The method includes inducing, via the changes in the magnetic field sensed, coil currents within each of the plurality of inductive coils. The method includes generating, in response to the coil currents induced, signals indicative of the rotation frequency of the rotatable member. The method includes generating, via a radio-frequency signal generator coupled to a transmitter-configured one of the plurality of inductive coils, an electrical signal that, when conducted by the transmitter-configured one of the plurality of inductive coils, radiatively transmits an electromagnetic signal. The method includes receiving, via each of the plurality of inductive coils not configured as the transmitter-configured one of the plurality of inductive coils, the electromagnetic signal radiatively transmitted by the inductive coil of the transmitter-configured one of the plurality of inductive coils. The method also includes determining, via a speed-probe monitor and based on the electromagnetic signals received, health of each of the plurality of inductive coils not configured as the transmitter-configured one of the plurality of inductive coils.

DETAILED DESCRIPTION

Figure 1:
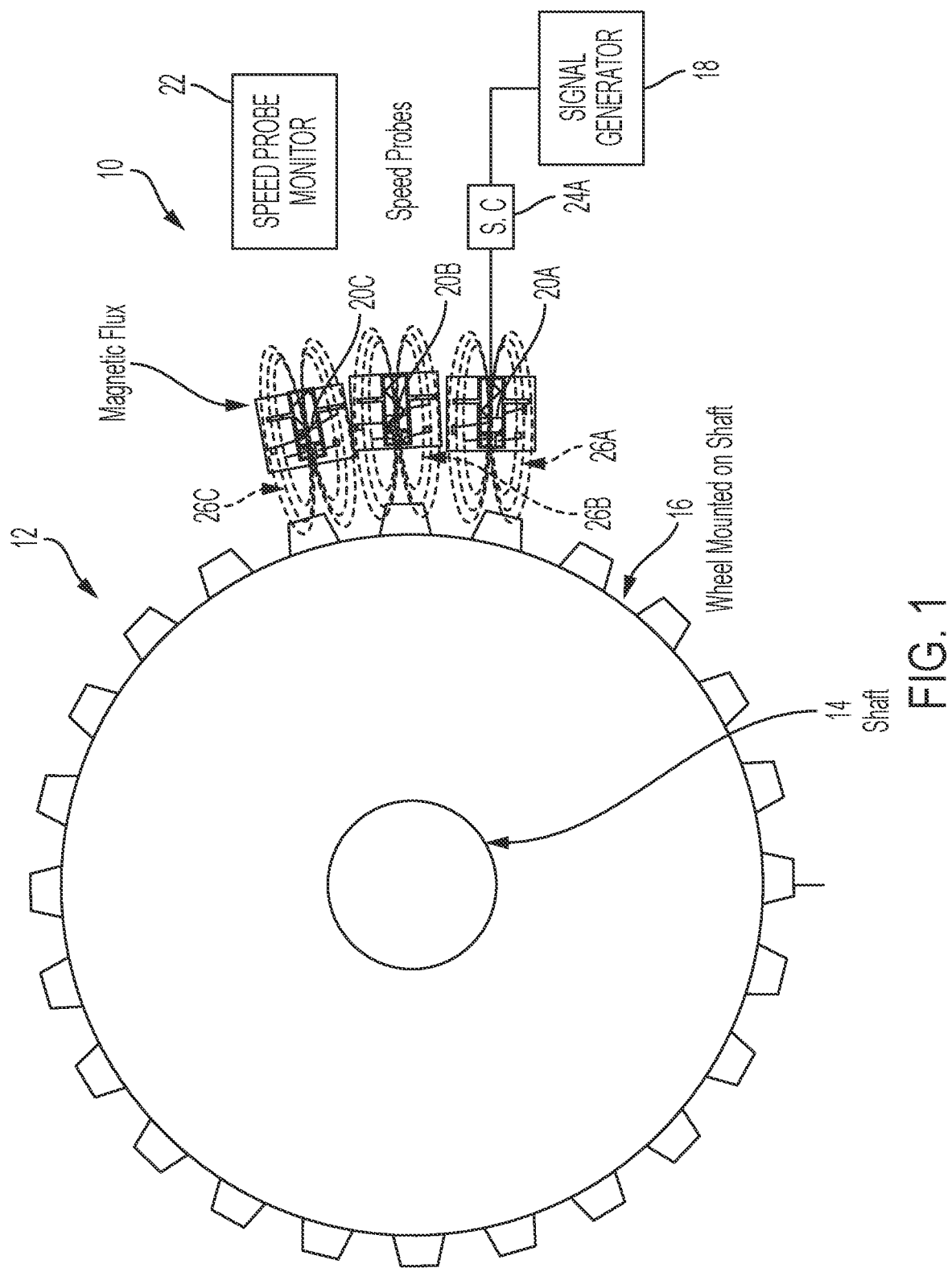
FIG. 1 is a schematic diagram of a self-monitoring rotational frequency sensing system.

Apparatus and associated methods relate to monitoring health of a system for sensing rotational frequency of a rotatable member. A magnetic speed probe detects a changing magnetic field that is caused by a toothed wheel disturbing the magnetic field as it rotates therethrough. The magnetic field is generated by a magnet, which is often a component of the magnetic speed probe. The magnetic field is preferentially channeled through high magnetic-permeable materials, such as can be used in the teeth of the toothed wheel. Because of such preferential channeling of the magnetic field, the magnetic field lines will be different when the magnet establishing the field is directly adjacent to a tooth of the toothed wheel than when the magnet is directly adjacent to a gap between teeth of the toothed wheel. An inductive coil, situated in the magnetic field can then detect such changes that occur in response to rotation of the toothed wheel. A coil current is induced in the inductive coil in response to the changing magnetic field. The time between peaks (or valleys) of this induced coil current corresponds to the time it takes to rotate the toothed wheel such that adjacent teeth (or gaps therebetween) to be adjacent the magnet generating the magnetic field. The inductive coil is the sensing element of the magnetic speed probe, but such an inductive coil can also be used as a radio transmitter or as a radio receiver as well, as will be described below. Such secondary use of the inductive coil can facilitate health monitoring of a system for measuring rotational frequency of a shaft.

A plurality of magnetic speed probes, each of which configured to sense the rotational frequency of the rotatable member, are arranged in relatively close proximity with one another, rotationally distributed about the rotatable member. Each of the magnetic speed probes has an inductive coil that can both: i) sense a changing magnetic field; and ii) transmit and/or receive a radio-frequency electromagnetic signal. At least one of the plurality of magnetic speed probes is configurable or is configured as a radio-frequency transmitter—a transmitter-configured one of the plurality of magnetic speed probes. The transmitter-configured one of the plurality of magnetic speed probes includes a signal coupler that couples an electrical signal generated by a radio-frequency signal generator into the inductive coil of the transmitter-configured magnetic speed probe, thereby radiatively transmitting the radio-frequency electromagnetic signal. The inductive coils of others of the plurality of magnetic speed probes—receiver-configured magnetic speed probes—can sense the radio-frequency electromagnetic signal transmitted by the transmitter-configured magnetic speed probe via coil current induced thereby into the inductive coils. A speed-probe monitor electrically coupled to each of the plurality of magnetic speed probes determines health of the system based on the coil current sensed by each of the plurality of magnetic speed probes in response to the electromagnetic signal radiatively transmitted.

For the purpose of such radio transmission, typically only one of the plurality of the magnetic speed probes is configuring as a radio transmitter and all others of the plurality of magnetic speed probes are configured as radio receivers. The transmitter-configured magnetic speed probe uses the inductive coil of the transmitter-configured magnetic speed probe as a radio transmitter, while the receiver-configured magnetic speed probes use the inductive coils of the receiver configured magnetic speed probes as radio receivers. A radio-frequency signal generator is coupled to the inductive coil of the transmitter-configured magnetic speed probe, so as to cause the transmitter-configured magnetic speed probe to radiatively transmit a radio-frequency electromagnetic signal. The radio-frequency signal generator generates a sweep of radio-frequency signals of known magnitude. The sweep of radio-frequency signals generated are then conducted within the inductive coil of the transmitter-configured magnetic speed probe, which causes the inductive coil of the transmitter-configured magnetic speed probe to act as a radio transmitter that radiatively transmits a sweep of radio-frequency electromagnetic signals.

The receiver-configured magnetic speed probes receive the sweep of radio-frequency electromagnetic signals radiatively transmitted by the inductive coil of the transmitter-configured magnetic speed probe, thereby inducing a sweep radio-frequency coil currents within the receiver-configured magnetic speed probes. Spectral peaks (i.e., the maximum amplitude of the sweep of radio-frequency coil currents, which occurs at a resonant frequency) in these radio-frequency coil currents induced within the receiver-configured magnetic speed probes can be determined. The resonant frequency within the sweeps of radio-frequency coil currents occurs at the frequency at which the maximum power is transferred from the transmitter-configured magnetic speed probe to the receiver-configured magnetic speed probe. Such radio-frequency coil currents and/or spectral peaks can be compared with reference radio-frequency coil currents and/or reference spectral peaks obtained at a previous time, such as a time of installation or at a time of calibration, for example. Health of the magnetic speed probes can be ascertained based on such a comparison of the radio-frequency coil currents and/or spectral peaks (e.g., comparison of resonant frequencies) induced into the inductive coils of the receiver-configured magnetic speed probes. Changes over time in these comparisons can be indicative of degradation of one or more of the plurality of magnetic speed probes.

A speed-probe monitor determines health of the magnetic speed probes based on the sweep(s) of radio-frequency coil currents received. Any degradation of the inductive coils of either the transmitter-configured magnetic speed probe, the receiver-configured magnetic speed probe, or degradation to any other electrical components coupled thereto can result in changes to the electrical parameters associated therewith. Such changes can result in changes to the efficacy of radiative transmission of the radio-frequency signals generated by the radio-frequency signal generator and of reception thereof by the receiver-configured magnetic speed probes. Such changes to the efficacy of radiative transmission and/or reception can be indicative of changes in the health of the transmitter-configured magnetic speed probe and/or the receiver-configured magnetic speed probe. Thus, the inductive coil of each of the plurality of magnetic speed probes is used for two purposes: i) as a sensing element configured to sense changes in the magnetic field due to rotation of the rotatable member; and ii) as a radio transmitter or a radio receiver configured to transmit or receive, respectively, a signal indicative of health of the transmitter-configured magnetic speed probe and/or the receiver-configured magnetic speed probe.

FIG. 1 is a schematic diagram of a self-monitoring rotational frequency sensing system. In FIG. 1, self-monitoring rotational frequency sensing system 10 is configured to sense rotation of rotatable member 12, which includes shaft 14 and toothed wheel 16 attached thereto. Self-monitoring rotational frequency sensing system 10 includes radio-frequency signal generator 18, magnetic speed probes 20A-20C, and speed-probe monitor 22. Magnetic speed probes 20A-20C are radially distributed about rotatable member 12, such that each of magnetic speed probes 20A-20C can sense the rotation of rotatable member 12. Such rotation of rotatable member 12 is sensed by sensing a change of a magnetic field caused by the rotation of the rotatable member 12. As teeth of rotatable member 12 sweep through magnetic fields 26A-26C induced by magnets of magnetic speed probes 20A-20C, magnetic fields 26A-26C are perturbed. Such perturbations of magnetic fields 26A-26C are then sensed by magnetic speed probes 20A-20C, respectively. Thus, self-monitoring rotational frequency sensing system 10, having multiple magnetic speed probes 20A-20C, can redundantly sense rotation of rotatable member 12. Such redundant sensing of rotation of rotatable member 12 can be used to provide accurate rotational frequency metrics even should one or more of magnetic speed probes 20A-20C fail.

Not only does self-monitoring rotational frequency sensing system 10 provide redundant measurement of rotational frequency, but it can also monitor its own health by conducting radio transmission between magnetic speed probes 20A-20C. One of magnetic speed probes 20A, 20B or 20C can be configured as a radio transmitter and others of magnetic speed probes 20A, 20B or 20C can be configured as radio receivers. Radio-frequency signal generator 18 is configured to generate a radio-frequency electrical signal (e.g., an electrical current signal) that will be used for radio transmission of a corresponding radio-frequency electromagnetic signal. Magnetic speed probes 20A-20C are arranged in transmissive proximity with one another. Magnetic speed probe 20A is configured as a radio transmitter. Magnetic speed probes 20B and 20C are configured as radio receivers. Transmitter-configured magnetic speed probe 20A includes signal coupler 24A, which couples the radio-frequency electrical signal generated by radio-frequency signal generator 18 into the inductive coil of transmitter-configured magnetic speed probe 20A, thereby radiatively transmitting the radio-frequency electromagnetic signal.

Figure 2:
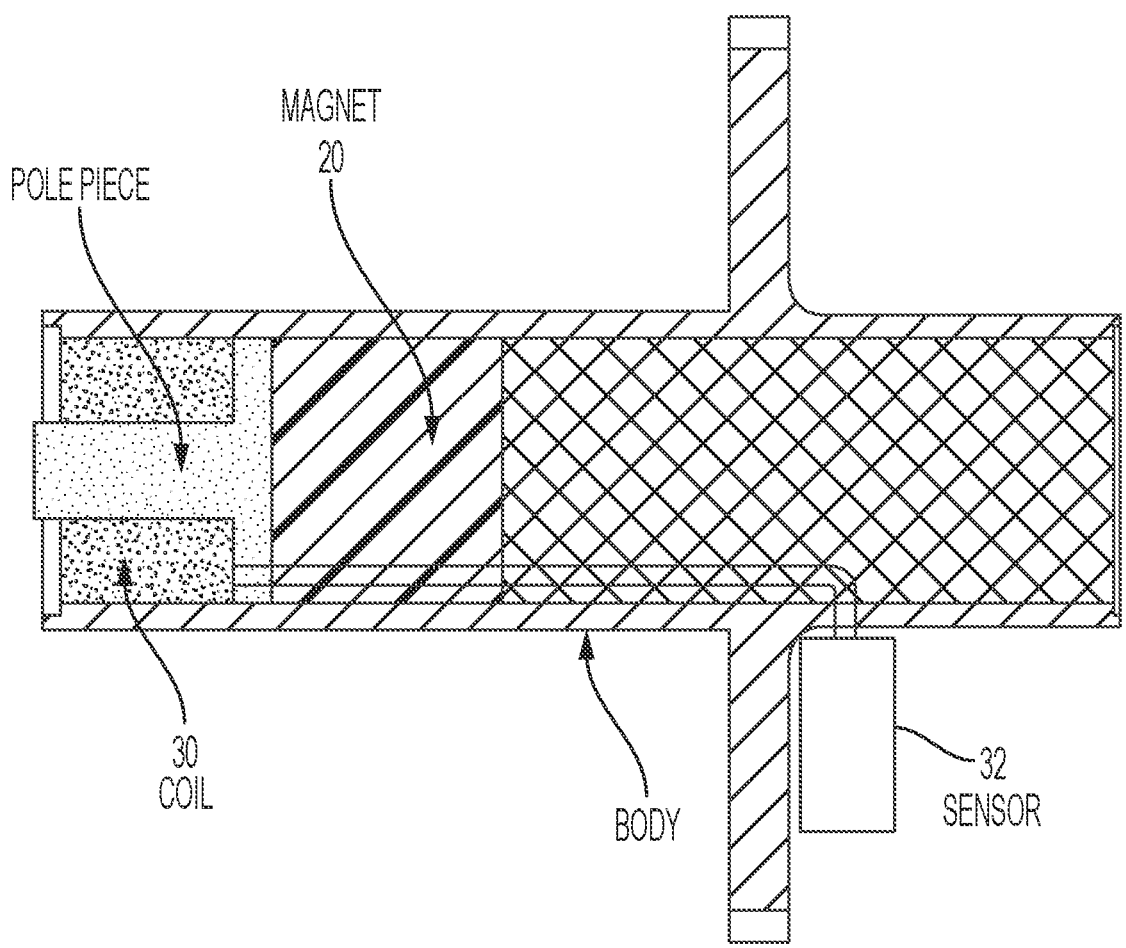
FIG. 2 is a schematic diagram of an embodiment of a magnetic speed probe used by the self-monitoring rotational frequency sensing system depicted in FIG. 1.

FIG. 2 is a schematic diagram of an embodiment of a magnetic speed probe used by the self-monitoring rotational frequency sensing system depicted in FIG. 1. Magnetic speed probe 20 includes magnet 28, inductive coil 30, and electrical-current sensor 22. Magnet 28 is configured to generate a magnetic field proximate rotatable a member proximate which magnetic speed probe can be mounted (e.g., rotatable member 12 depicted in FIG. 1). Magnet 28 and inductive coil 30 are positioned proximate rotatable member 12. Rotation of rotatable member 12 causes changes in the magnetic field generated by magnet 28. During rotation of shaft 14, every tooth of toothed wheel 16 will traverse through a directional path of inductive coil 30 (or proximate inductive coil 30), thereby causing changes in the magnetic field proximate inductive coil 30. Such changes in the magnetic field proximate inductive coil 30 then induces a coil current within inductive coil 30. This induced coil current in inductive coil 30 is indicative of such a traversal by toothed wheel 16. A frequency of such traversals, as indicated by the induced currents caused thereby, is indicative of rotational frequency of shaft 14. Electrical-current sensor 32 is conductively coupled to inductive coil 30, such that coil current induced into inductor 30 can be sensed by electrical-current sensor 32. In some embodiments, instead of sensing electrical current by magnetic speed probe 20, electrical current is sensed elsewhere, such as, for example, within speed-probe monitor 22 (depicted in FIG. 1). In some embodiments magnetic speed probe has signal conditioning circuitry to condition the electrical signals induced in inductive coil 30, such as, for example, filter circuitry.

Coil currents induced into inductive coil 30 or receiver-configured magnetic speed probes (e.g., magnetic speed probes 20B and 20C as depicted in FIG. 1) can result from either: i) rotation of rotatable member 12; or ii) radiative transmission of radio-frequency electromagnetic signal by a transmitter-configured magnetic speed probe (e.g., magnetic speed probes 20A as depicted in FIG. 1). These two types of coil currents can be distinguishable from one another in various ways. For example, radiative transmission can be performed at discrete times different from time period during which sensing of rotation is being performed. Another way of distinguishing these two types of coil currents is by their frequency components. A minimum frequency of the radio-frequency electromagnetic signals radiatively transmitted by transmitter-configured magnetic speed probe 20A is greater than a maximum frequency of the coil current induced within inductive coils 30 via changes in the magnetic field of the magnet 28 caused by rotation of rotatable member 12. Such disparate frequencies can permit simultaneous operation of determining rotational frequency of rotatable member 12 and health monitoring of magnetic speed probes 20A-20C. In some embodiments, a ratio of the minimum frequency of the radio-frequency electromagnetic signals to the maximum frequency of the coil signal indicative of rotation frequency of the rotatable member is greater than 10:1, 100:1, 1000:1, or more.

Figure 3A:
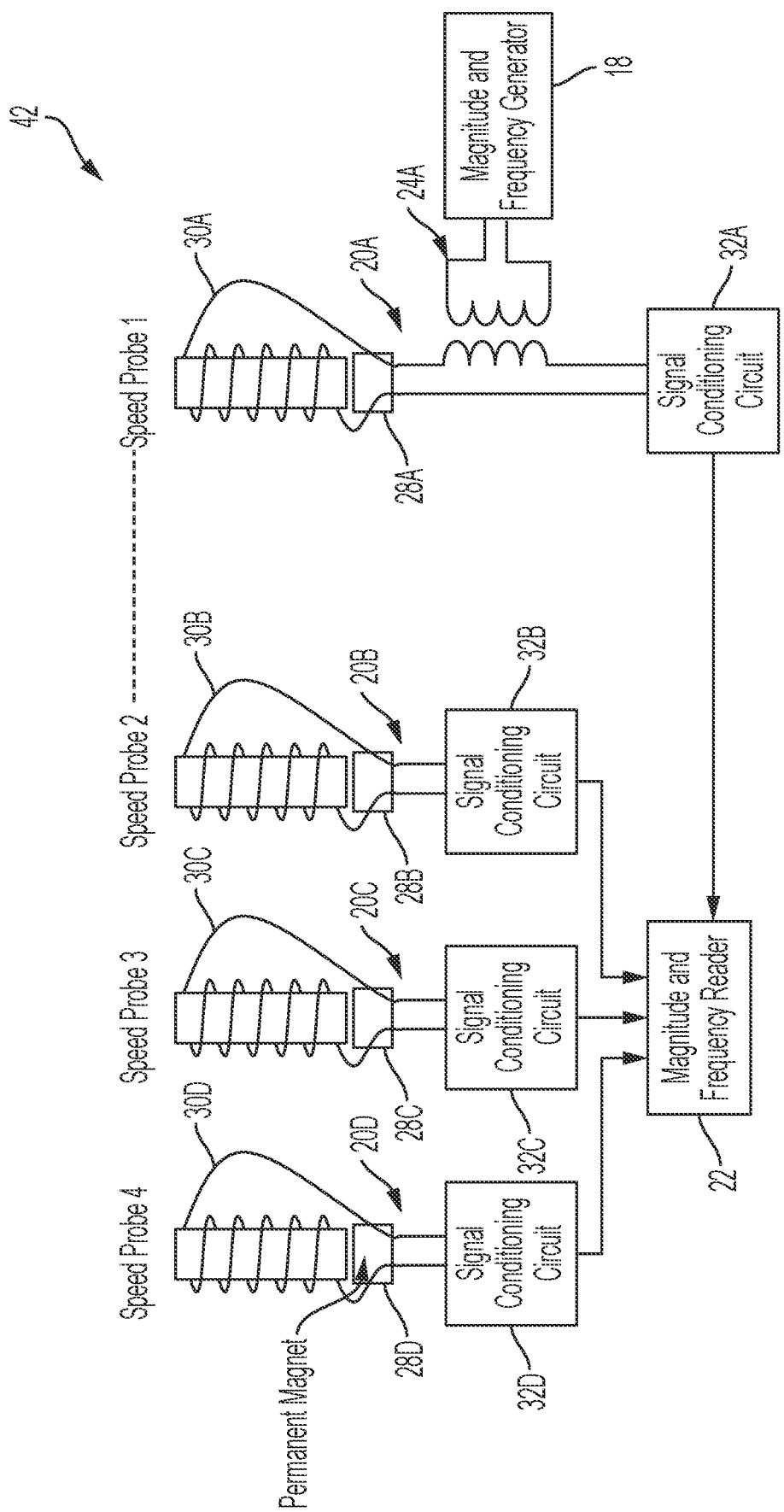
FIGS. 3A-3B are schematic diagrams of two embodiments of self-monitoring rotational frequency sensing systems.
Figure 3B:
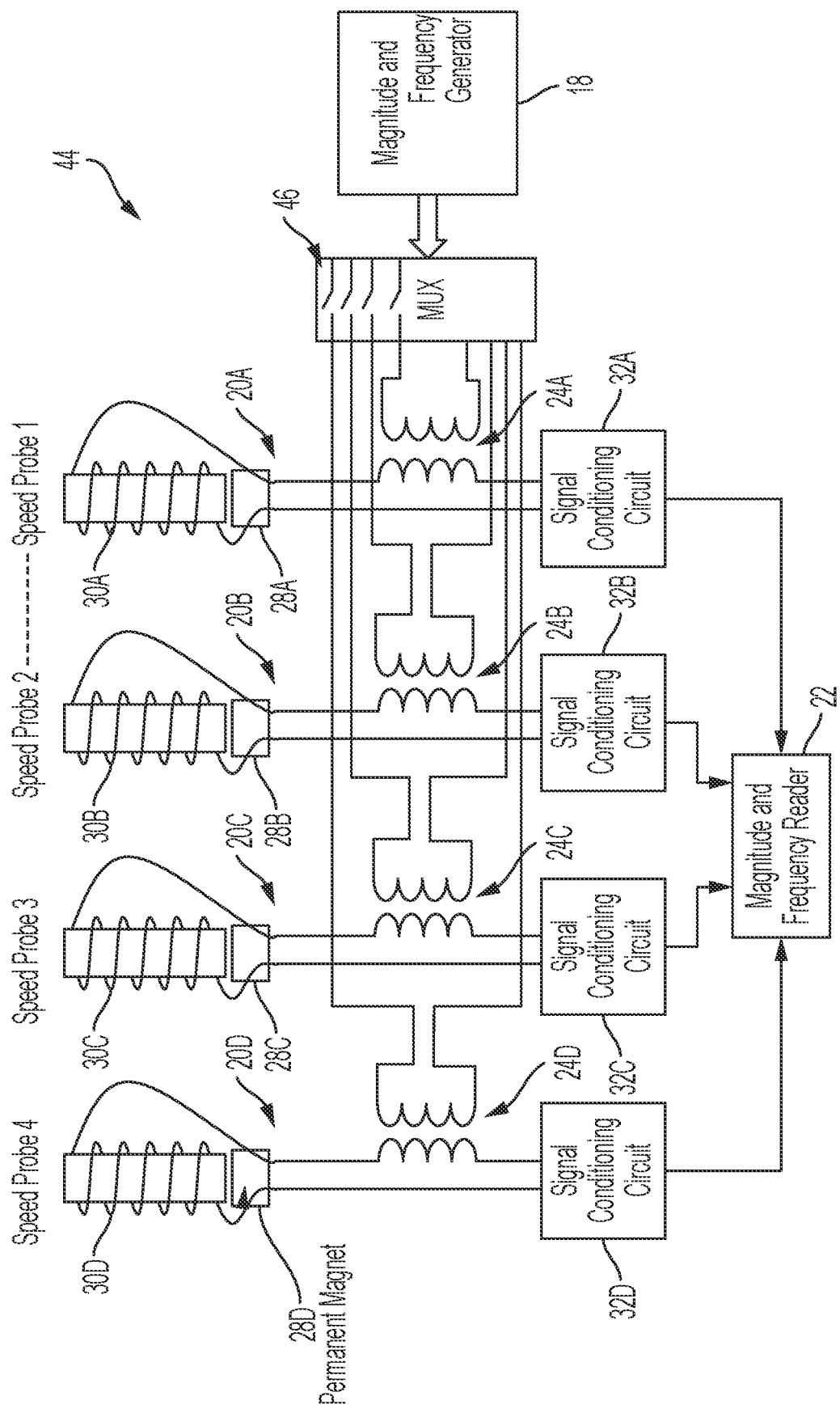

FIGS. 3A-3B are schematic diagrams of two embodiments of self-monitoring rotational frequency sensing systems. In FIG. 3A, self-monitoring rotational frequency sensing system 42 has dedicated transmitter-configured 20A and receiver-configured 20B-20D magnetic speed probes. Self-monitoring rotational frequency sensing system 42 includes radio-frequency signal generator 18, magnetic speed probes 20A-20D, and speed-probe monitor 22. Dedicated transmitter-configured magnetic speed probe 20A includes magnet 28A, inductive coil 30A, electrical-current sensor 32A and signal coupler 24A. Signal coupler 24A is depicted as a transformer that couples the radio-frequency electrical signals generated by radio-frequency signal generator 18 into inductive coil 30A of transmitter configured magnetic speed probe 20A.

Receiver-configured magnetic speed probes 20B-20D include magnets 28B-28D, inductive coils 30B-30D, electrical-current sensors 32B-32D, respectively. Because receiver-configured magnetic speed probes 20B-20D are dedicated as radio receivers, none of receiver-configured magnetic speed probes 20B-20D includes a signal coupler. In some embodiments, rotational frequency of rotatable member 12 is calculated, based on coil currents induced within inductive coils 30A-30D via rotation of rotatable member 12, by each of magnetic speed probes 20A-20D.

Speed-probe monitor 22 is conductively coupled to each of electrical-current sensors 32A-32D of magnetic speed probes 20A-20D, the speed-probe monitor can determine, based on the coil current sensed by electrical-current sensors 32A-32D of each of magnetic speed probes 20A-20D in response to the electromagnetic signal radiatively transmitted by transmitter-configured magnetic speed probe 20A, health of the rotational frequency sensing system 42. In some embodiments, rotational frequency of rotatable member 12 is calculated, based on coil currents induced within inductive coils 30A-30D via rotation of rotatable member 12, by speed-probe monitor 22.

In FIG. 3B, self-monitoring rotational frequency sensing system 44 has magnetic speed probes that can be configured as either radio transmitters or radio receivers. In such a configurable system, any of magnetic speed probes 20A-20D can be configured as a radio transmitter, while others of magnetic speed probes 20A-20D can be configured as radio receivers. As in the FIG. 3A, embodiment, self-monitoring rotational frequency sensing system 44 includes radio-frequency signal generator 18, magnetic speed probes 20A-20D, and speed-probe monitor 22. Unlike the FIG. 3A embodiment, however, self-monitoring rotational frequency sensing system 44 also includes mux (or switching network) 46 and each of magnetic speed probe 20A-20D are identical to one another, having magnets 28A-28D, inductive coils 30A-30D, electrical-current sensor 32A-32D, and signal couplers 24A-24D. Signal couplers 24A-24D is depicted as a transformers that couple the radio-frequency electrical signals generated by radio-frequency signal generator 18 into a mux-selected inductive coils (e.g., one of 30A-30D) of a transmitter-configured magnetic speed probe (e.g., one of 20A-20D).

Receiver-configured magnetic speed probes (e.g., the unselected ones of 20A-20D) include magnets (e.g., the corresponding ones of 28A-28D), inductive coils (e.g., the corresponding ones of 30A-30D), electrical-current sensors (e.g., the corresponding ones of 32B-32D), respectively. Although receiver-configured magnetic speed probes (e.g., the unselected ones of 20A-20D) are configured as radio receivers (e.g., due to being unselected by mux 46), they each include a signal coupler (e.g., the corresponding ones of 24A-24D). In some embodiments, rotational frequency of rotatable member 12 is calculated, based on coil currents induced within inductive coils 30A-30D via rotation of rotatable member 12, by each of magnetic speed probes 20A-20D.

As in the FIG. 3A embodiment, speed-probe monitor 22 is conductively coupled to each of electrical-current sensors 32A-32D of magnetic speed probes 20A-20D, the speed-probe monitor can determine, based on the coil current sensed by electrical-current sensors 32A-32D of each of magnetic speed probes 20A-20D in response to the electromagnetic signal radiatively transmitted by transmitter-configured magnetic speed probe 20A, health of the rotational frequency sensing system 32. In some embodiments, rotational frequency of rotatable member 12 is calculated, based on coil currents induced within inductive coils 30A-30D via rotation of rotatable member 12, by speed-probe monitor 22.

Figure 4:
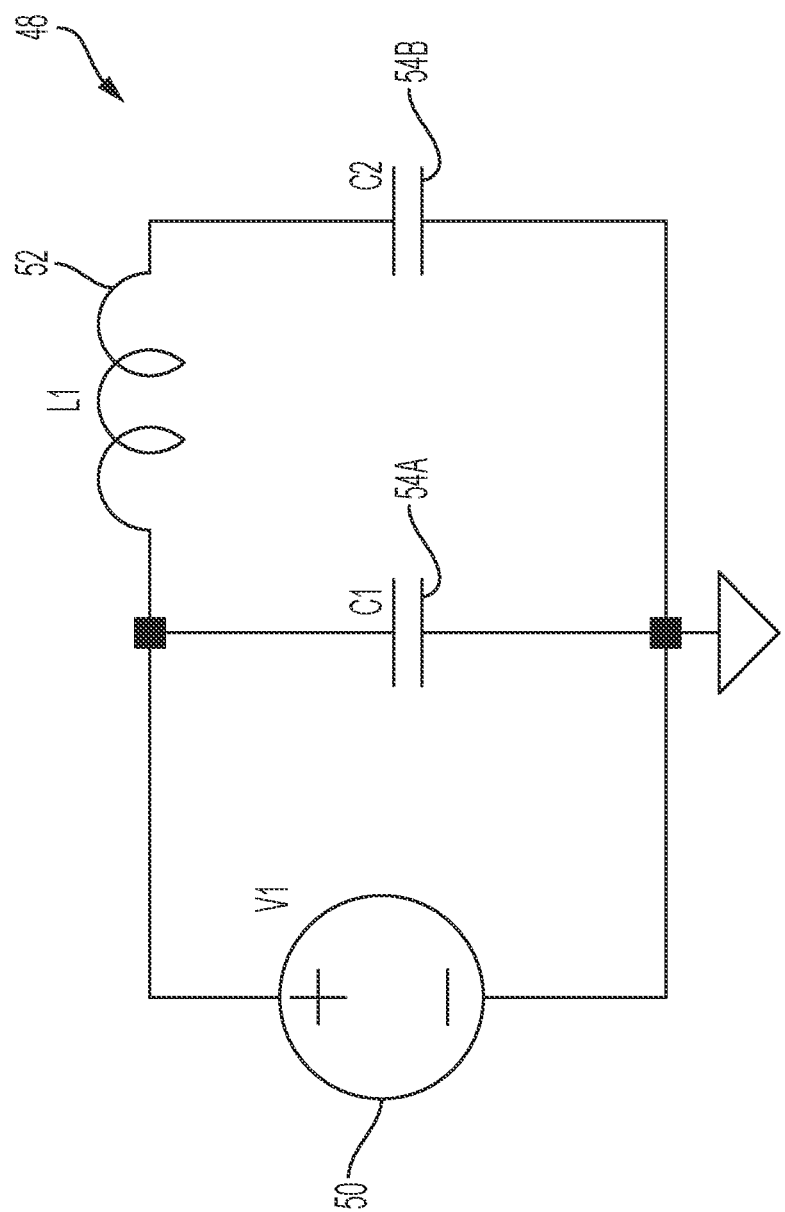
FIG. 4 is an equivalent circuit of an inductive coil of a magnetic speed probe.

FIG. 4 is an equivalent circuit of an inductive coil of a magnetic speed probe. In FIG. 4, equivalent circuit 48 is used to describe speed-probe monitoring of magnetic speed probe 20. Equivalent circuit 48 includes power source 50, inductor 52, and capacitors 54A and 54B. Power source 50 is a schematic model for radio-frequency signal generator 18 (as depicted in FIG. 2). Inductor 52 is a schematic model of the inductance of inductive coil 30 (as depicted in FIG. 2). Capacitors 54A and 54B are schematic models of the parasitic capacitance associated with inductive coil 30 and any other parasitic capacitances of a circuit including inductive coil 30 and radio-frequency signal generator 18 (as well as signal coupler 24). The inductance $L_{IND}$ of inductor 30 is given by:

$$L_{IND} = N^2 \mu_0 \mu_r \left(\frac{D}{2}\right)\left[\ln\left(\frac{8D}{d}\right) - 2\right], \quad (1)$$

where: N is the number of turns of the inductive coil; $\mu_0$ is the permeability of free space; $\mu_r$ is the relative permeability of a magnetic core, about which inductive coil is turned; D is the diameter of the magnetic core; and d is the wire diameter. The parasitic capacitance $C_{PAR}$ is, at least in part, a result of the capacitance between adjacent turns of the inductive coil.

Such a circuit as equivalent circuit 48 is sometimes called a resonant tank circuit. Equivalent circuit 48 has various characteristics that can be measured and characterize the circuit. For example, equivalent circuit 48 has a resonant frequency. Such resonant frequency of tank circuit 48 is given by:

$$f_0 = \frac{1}{2\pi\sqrt{L_{IND}C_{PAR}}}. \quad (2)$$

Any changes to either the parasitic capacitance $C_{PAR}$ or to the inductance $L_{IND}$ of the inductive coil will result in a change to the resonant frequency $f_0$ of equivalent circuit 48. Thus, resonant frequency $f_0$ can be used as a metric of health of inductive coil 30.

For example, radio-frequency signal generator 18 (as depicted in FIG. 1) can generate a frequency sweep of radio-frequency signals (for example sinusoids) about a nominal resonant frequency $f_0$. For example, radio-frequency signal generator 20 can generate a frequency sweep of radio-frequency signals from a frequency minimum $f_{min} < f_0$ to a frequency maximum $f_{max} > f_0$. In The range of frequencies $f_{min} < f_{sweep} < f_{max}$ of the frequency sweep of radio-frequency signals can be such that a frequency ration $f_{max}/f_{min}$ is greater than 1.2, 1.5, 2.0 or more.

A speed-probe monitor, such as speed-probe monitor 22 depicted in FIG. 1, can generate a signal indicative of health of each of magnetic speed probes, such as magnetic speed probes 20A-20D as depicted in FIGS. 3A and 3B. Such a signal can be generated based on one or more metrics of the radio-frequency signals received by radio receivers 24A-24D, such as, for example, the resonant frequency $f_0$. In some embodiments, the resonant frequency determined $f_0$ is compared with a reference resonant frequency $f_0$. The reference resonant frequency $f_{0\text{-}ref}$ can be a resonant frequency determined at a prior time, such as, for example, a time of calibration or a time of first operation. In some embodiments, if the resonant frequency is not found to be within the range of frequencies $f_{min} < f_{sweep} < f_{max}$ of the frequency sweep, a signal indicative of such a condition is generated. In some embodiments, amplitude $A_{res}$ at resonant frequency $f_0$ is used as a metric of health of each of the magnetic speed probes. Such an amplitude $A_{res}$ can then be compared with a reference amplitude $A_{res\text{-}ref}$. In some embodiments, amplitude $A_{test}$ of the radio-frequency signals is measured at a single test frequency $f_{test}$. Again, such an amplitude is then compared with a reference amplitude $A_{test\text{-}ref}$.

Various other metrics can be used, as well as various other radio-frequency signals. For example, instead of generating a frequency sweep of radio-frequency signals, a metric of health of magnetic speed probe 20A, for example, can be obtained using time domain methods. In such embodiments, radio-frequency signal generator can generate pulses, which include various high-frequency signal components, to be radiatively transmitted by inductive coil 30A. Such pulses radiatively transmitted by inductive coil 30A are then received by inductive coils 30B-30D and sensed by current sensors 32B-32D. Various metrics, such as, for example, pulse amplitude $A_{pulse}$, pulse width $W_{pulse}$, etc., of the pulses received by antenna 22 inductive coils 30B-30D and sensed by current sensors 32B-32D can be used as metrics of the health of magnetic speed sensor 12, 42, and 44. Such time domain metrics contain much of the same information as the frequency domain metrics described above, and so can be used as an alternate way of obtaining health metrics.

Figure 5:
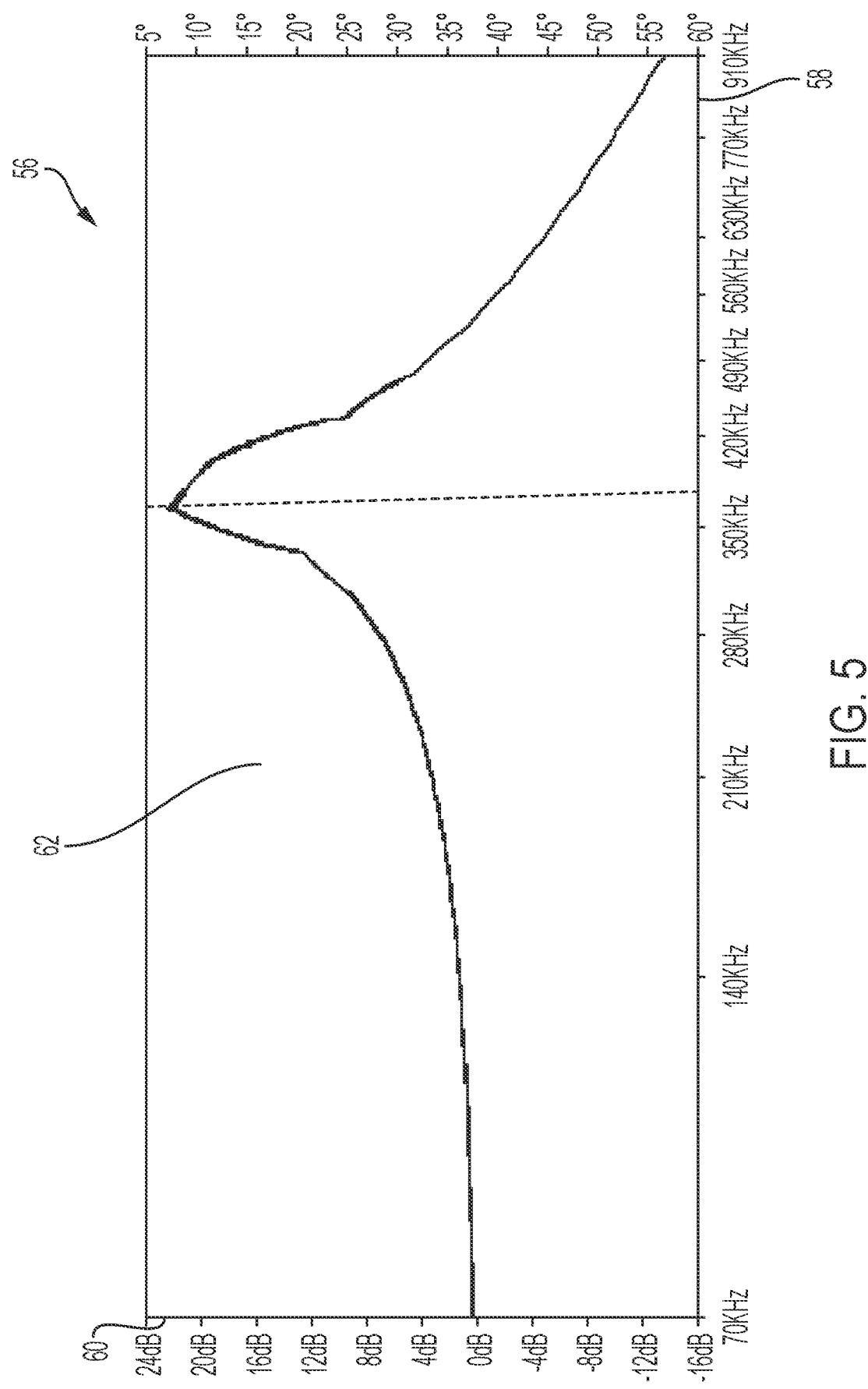
FIG. 5 is a graph of radiatively transmitted and received radio-frequency signals of a health-monitoring magnetic speed probe.

FIG. 5 is a graph of radiatively transmitted and received radio-frequency signals of a health-monitoring magnetic speed probe. In FIG. 5, graph 56 includes horizontal axis 58, vertical axis 60 and amplitude-frequency relation 62. Horizontal axis 58 is indicative of frequency of a frequency sweep or radio frequency signals transmitted by inductive coil 30 of a transmitter-configured magnetic speed probe 20. Vertical axis 60 is indicative of amplitudes of radio frequency signals of the frequency sweep transmitted by inductive coil 30. In the depicted graph, the amplitudes of the frequency sweep or radio frequency signals was held constant between a minimum frequency $f_{min}$ and a maximum frequency $f_{max}$. Such amplitudes need not be constant, however, for speed-probe monitoring of magnetic speed probe 14 as will be described below.

Graph 56 also includes amplitude-frequency relation 62 of a coil current induced within an inductive coil 30 and sensed by an electrical-current sensor 32 of a receiver-configured magnetic speed probe. In the depicted embodiment, the amplitudes of amplitude-frequency relation 62 depict a resonant frequency $f_0$ between the minimum frequency $f_{min}$ and the maximum frequency $f_{max}$ of the frequency sweep of radio frequency signals transmitted by inductive coil 30. Changes in the resonant frequency can be indicative of changes in the health of magnetic speed probes 20A-20D. Such changes can reflect changes in the electrical parameters of inductance 52 and parasitic capacitances 54A and 54B as described above, with reference to FIG. 5.

In embodiments, in which the amplitudes of the frequency sweep or radio frequency signals, as generated by radio-frequency signal generator 18 is not constant between a minimum frequency $f_{min}$ and a maximum frequency $f_{max}$, a ratio $A_{sense}/A_{transmit}$ of the amplitudes sensed by receiver-configured magnetic speed probes to the amplitude transmitted by inductive coil 30 of a transmitter-configure magnetic speed probe can be indicative of the resonant frequency $f_0$. In such embodiments that ratio $A_{sense}(f_0)/A_{transmit}(f_0)$ of amplitudes at the resonant frequency $f_0$ can also be indicative of health of magnetic speed probes 20A-20D.

Figure 6:
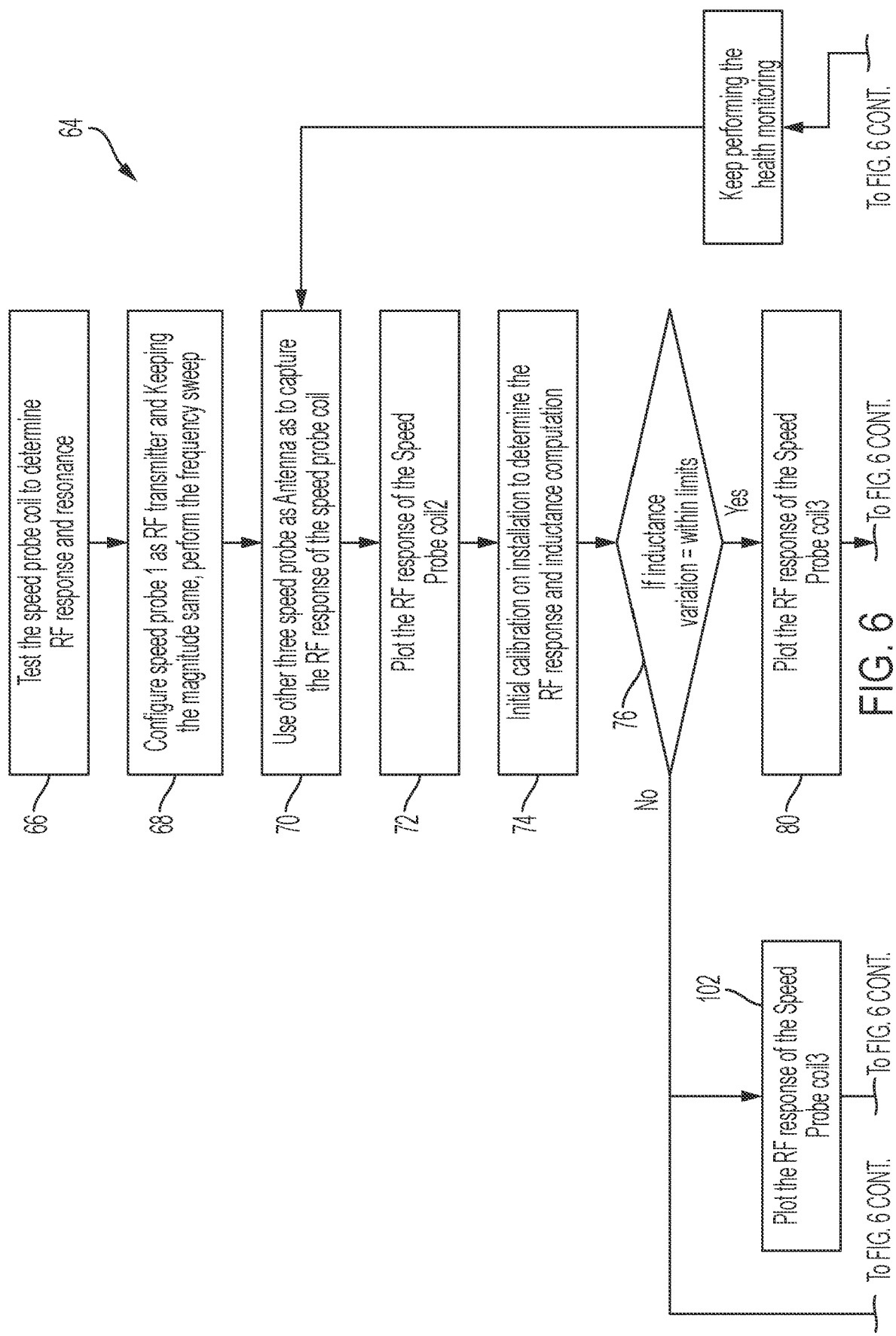
FIG. 6 is a flowchart of a method of health-monitoring of a magnetic speed probe.

FIG. 6 is a flowchart of a method of health-monitoring of a magnetic speed probe. In FIG. 6, method 64 describes an exemplary method of using either of self-monitoring rotational frequency sensing system 44 and 46, as depicted in FIGS. 3A and 3B, respectively. Method 64 begins at step 66, where inductive coil 30A of magnetic speed probe 20A is tested to determine its RF response and resonance. Then, at step 68, magnetic speed probe 20A is configured as a radio transmitter by mux-selecting electrical conduction of radio-frequency signals generated by radio. At step 68 transmitter-configured magnetic speed probe 20A radiatively transmits a radio-frequency electromagnetic signal. Then, at step 70, receiver-configured magnetic speed probe 20B receives and captures the radio-frequency electromagnetic signal transmitted by transmitter-configured magnetic speed probe 20A. At step 72, a spectral analysis of the radio-frequency electromagnetic signal captured by receiver-configured magnetic speed probe 20B is performed. Then, at step 74, initial determination of inductance and RF response of transmitter-configured magnetic speed probe 20A is performed.

If, at step 76, the inductance of transmitter-configured magnetic speed probe 20A determined during at step 74 is not within acceptable limits, method 64 proceeds to step 78, at which step, transmitter-configured magnetic speed probe 20A is sent out for repair. If, however, at step 76, the inductance of transmitter-configured magnetic speed probe 20A determined at step 74 is within acceptable limits, method 64 proceeds to step 80, a spectral analysis of the radio-frequency electromagnetic signal captured by receiver-configured magnetic speed probe 20C is performed. Then, at step 82, determination of inductance and RF response of transmitter-configured magnetic speed probe 20A is performed.

If, at step 84, the inductance of transmitter-configured magnetic speed probe 20A determined during at step 82 is not within acceptable limits, method 64 proceeds to step 86, where a spectral analysis of the radio-frequency electromagnetic signal captured by receiver-configured magnetic speed probe 20D is performed. Then, at step 88, determination of inductance and RF response of transmitter-configured magnetic speed probe 20A is performed. If, at step 90, the inductance of transmitter-configured magnetic speed probe 20A determined during at step 88 is not within acceptable limits, method 64 proceeds to step 92, where transmitter-configured magnetic speed probe 20C is sent out for repair.

If, however, at step 84, the inductance of transmitter-configured magnetic speed probe 20A determined at step 82 is within acceptable limits, method 64 proceeds to step 94, a spectral analysis of the radio-frequency electromagnetic signal captured by receiver-configured magnetic speed probe 20D is performed. Then, at step 96, determination of inductance and RF response of transmitter-configured magnetic speed probe 20A is performed. If, at step 98, the inductance of transmitter-configured magnetic speed probe 20A determined during at step 96 is not within acceptable limits, method 64 proceeds to step 100, where transmitter-configured magnetic speed probe 20D is sent out for repair. If, however, at step 98, the inductance of transmitter-configured magnetic speed probe 20A determined at step 96 is within acceptable limits, method 64 returns to step 70, so as to continue monitoring the system.

At step 74, if the inductance of transmitter-configured magnetic speed probe 20A determined during at step 76 was not within acceptable limits, method 64 also proceeds to step 102, where a spectral analysis of the radio-frequency electromagnetic signal captured by receiver-configured magnetic speed probe 20C is performed. Then, at step 104, determination of inductance and RF response of transmitter-configured magnetic speed probe 20A is performed. If, at step 106, the inductance of transmitter-configured magnetic speed probe 20A determined during at step 104 is not within acceptable limits, method 64 proceeds to step 78 transmitter-configured magnetic speed probe 20A is sent out for repair.

If, however, at step 106, the inductance of transmitter-configured magnetic speed probe 20A determined at step 104 is within acceptable limits, method 64 proceeds to step 108, a spectral analysis of the radio-frequency electromagnetic signal captured by receiver-configured magnetic speed probe 20D is performed. Then, at step 110, determination of inductance and RF response of transmitter-configured magnetic speed probe 20A is performed. If, at step 112, the inductance of transmitter-configured magnetic speed probe 20A determined during at step 110 is not within acceptable limits, method 64 proceeds to step 78, where transmitter-configured magnetic speed probe 20A is sent out for repair. If, however, at step 112, the inductance of transmitter-configured magnetic speed probe 20A determined at step 110 is within acceptable limits, method 64 proceeds to step 114, where transmitter-configured magnetic speed probe 20B is sent out for repair.

Discussion of Possible Embodiments

The following are non-exclusive descriptions of possible embodiments of the present invention.

Apparatus and associated methods relate to a system for sensing rotational frequency of a rotatable member and for monitoring health of the system. The system includes a radio-frequency signal generator, a plurality of magnetic speed probes and a speed probe monitor. The radio-frequency signal generator generates an electrical signal. The plurality of magnetic speed probes is arranged in transmissive proximity with one another. Each of the plurality of speed probes includes a magnet, and inductive coil, and an electrical current sensor. The magnet generates a magnetic field proximate the rotatable member. Rotation of the rotatable member causes changes in the magnetic field generated by the magnet. The inductive coil is positioned proximate the rotatable member. The electrical-current sensor is coupled to the inductive coil, the electrical-current sensor senses a coil current induced within the inductive coil. A transmitter-configured one of the plurality of magnetic speed probes includes a signal coupler that couples the electrical signal generated by the radio-frequency signal generator into an inductive coil of the transmitter-configured magnetic speed probe, thereby radiatively transmitting an electromagnetic signal. The speed-probe monitor is electrically coupled to each of the electrical-current sensors of the plurality of magnetic speed probes. The speed-probe monitor determines, based on the coil current sensed by the electrical-current sensor of each of the plurality of magnetic speed probes in response to the electromagnetic signal radiatively transmitted by the transmitter-configured magnetic speed probe, health of the system.

The system of the preceding paragraph can optionally include, additionally and/or alternatively, any one or more of the following features, configurations and/or additional components:

A further embodiment of the foregoing system, wherein each of the plurality of magnetic speed probes can further include a speed calculator that calculates, based on the coil current induced within the inductive coil in response to the changes in the magnetic field caused by the rotation of the rotatable member, the rotational frequency of the rotatable member.

A further embodiment of any of the foregoing systems, wherein the plurality of magnetic speed probes can include the transmitter-configured magnetic speed probe and at least one receiver-configured magnetic speed probe, wherein the electrical signal generated by the radio-frequency signal generator is not conductively coupled into the inductive coil of each of the at least one receiver-configured magnetic speed probe.

A further embodiment of any of the foregoing systems, wherein the electromagnetic signal radiatively transmitted by the transmitter-configured magnetic speed probe can include a band of frequencies.

A further embodiment of any of the foregoing systems, wherein the speed-probe monitor can determine a frequency response of each of the at least one receiver-configured magnetic speed probe.

A further embodiment of any of the foregoing systems, wherein the speed-probe monitor can further determine, based on the frequency response, an inductance for the inductor of each of the at least one receiver-configured magnetic speed probe.

A further embodiment of any of the foregoing systems, wherein the speed-probe monitor can further determine, based on the frequency response, a resonant frequency of each of the at least one receiver-configured magnetic speed probe.

A further embodiment of any of the foregoing systems, wherein the speed-probe monitor can generate, in response to the frequency response, a signal indicative of maintenance needed for each of the receiver-configured magnetic speed probe.

A further embodiment of any of the foregoing systems, wherein the speed-probe monitor can determine, based on the coil current sensed, an impedance of each of the at least one receiver-configured magnetic speed probe.

A further embodiment of any of the foregoing systems, wherein each of the plurality of magnetic speed probes can be configurable either as a transmitter-configured magnetic speed probe or as a receiver-configured magnetic speed probe.

A further embodiment of any of the foregoing systems can further include a sequence controller that sequentially configures a each of the plurality of magnetic speed probes as the transmitter-configured magnetic speed probe, and others of the plurality of magnetic speed probes configured as receiver-configured magnetic speed probes.

A further embodiment of any of the foregoing systems, wherein the magnet can be a permanent magnet.

A further embodiment of any of the foregoing systems, wherein the magnet can be an electro-magnet.

A further embodiment of any of the foregoing systems, wherein the magnet can be mounted to the rotatable member.

A further embodiment of any of the foregoing systems, wherein the magnet can be mounted to a non-rotatable member proximate the rotatable member.

A further embodiment of any of the foregoing systems, wherein a minimum frequency of the electrical signal generated by the radio-frequency signal generator can be greater than a maximum frequency of the coil current being induced within the inductive coil in response to the changes in the magnetic field caused by the rotation of the rotatable member.

A further embodiment of any of the foregoing systems, wherein a ratio of the minimum frequency of the electrical signal generated by the radio-frequency signal generator to the maximum frequency of the coil current being induced within the inductive coil can be greater than 10:1.

Some embodiments relate to a method for a sensing rotation frequency of a rotatable member and for monitoring health thereof. The method includes generating, via a magnet, a magnetic field proximate the rotatable member. The method includes causing, via rotation of the rotatable member, changes in the magnetic field generated by the magnet. The method includes positioning a plurality of inductive coils proximate the rotatable member so as to sense changes in the magnetic field. The method includes inducing, via the changes in the magnetic field sensed, coil currents within each of the plurality of inductive coils. The method includes generating, in response to the coil currents induced, signals indicative of the rotation frequency of the rotatable member. The method includes generating, via a radio-frequency signal generator coupled to a transmitter-configured one of the plurality of inductive coils, an electrical signal that, when conducted by the transmitter-configured one of the plurality of inductive coils, radiatively transmits an electromagnetic signal. The method includes receiving, via each of the plurality of inductive coils not configured as the transmitter-configured one of the plurality of inductive coils, the electromagnetic signal radiatively transmitted by the inductive coil of the transmitter-configured one of the plurality of inductive coils. The method also includes determining, via a speed-probe monitor and based on the electromagnetic signals received, health of each of the plurality of inductive coils not configured as the transmitter-configured one of the plurality of inductive coils.

The method of the preceding paragraph can optionally include, additionally and/or alternatively, any one or more of the following features, configurations and/or additional components:

A further embodiment of the foregoing method, wherein each of the plurality of inductive coils can be configurable either as a transmitter-configured inductive coil or as a receiver-configured inductive coil.

A further embodiment of any of the foregoing methods can further include sequentially configuring, via a sequence controller, each of the plurality of inductive coils as the transmitter-configured magnetic speed probe, and others of the plurality of inductive coils configured as receiver-configured inductive coils.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A system for sensing rotational frequency of a rotatable member and for monitoring health of the system, the system comprising:
a radio-frequency signal generator that generates an electrical signal;
a first magnetic speed probe configured as a transmitter;
a second magnetic speed probe configured as a receiver, wherein the first and second magnetic speed probes are arranged in transmissive proximity with one another, each of the first and second magnetic speed probes includes:
a magnet for generating a magnetic field proximate the rotatable member, rotation of the rotatable member causing changes in the magnetic field generated by the magnet;
an inductive coil positioned proximate the rotatable member; and
an electrical-current sensor coupled to the inductive coil, the electrical-current sensor sensing coil current induced within the inductive coil,
wherein the first magnetic speed probe further includes a signal coupler that couples the electrical signal generated by the radio-frequency signal generator into the inductive coil of the first magnetic speed probe, thereby radiatively transmitting an electromagnetic signal; and
a speed-probe monitor electrically coupled to each of the electrical-current sensors of the first and second magnetic speed probes, the speed-probe monitor determining health of the system based on the coil current sensed by the second magnetic speed probe in response to the electromagnetic signal radiatively transmitted by the first magnetic speed probe.

2. The system of claim 1, wherein each of the first and second magnetic speed probes further includes:
a speed calculator that calculates the rotational frequency of the rotatable member based on the coil current induced within the inductive coil in response to the changes in the magnetic field caused by the rotation of the rotatable member.

3. The system of claim 1, wherein the electrical signal generated by the radio-frequency signal generator is not conductively coupled into the inductive coil of the second magnetic speed probe.

4. The system of claim 1, wherein the electromagnetic signal radiatively transmitted by the first magnetic speed probe includes a band of frequencies.

5. The system of claim 1, wherein the speed-probe monitor determines a frequency response of the second magnetic speed probe.

6. The system of claim 5, wherein the speed-probe monitor further determines, based on the frequency response, an inductance for the inductor of the second magnetic speed probe.

7. The system of claim 5, wherein the speed-probe monitor further determines a resonant frequency of the second magnetic speed probe based on the frequency response.

8. The system of claim 7, wherein the speed-probe monitor further makes a frequency comparison between the resonant frequency determined to a reference frequency for the second magnetic speed probe.

9. The system of claim 8, wherein the speed-probe monitor generates a signal indicative of maintenance needed for the second magnetic speed probe in response to the frequency response.

10. The system of claim 1, wherein the speed-probe monitor determines an impedance of the second magnetic speed probe based on the coil current sensed.

11. The system of claim 1, wherein each of the first and second magnetic speed probes is configurable either as a transmitter or as a receiver.

12. The system of claim 11, further comprising:
a sequence controller that sequentially configures a each of the first and second magnetic speed probes as the transmitter, and an other of the first and second magnetic speed probes as the receiver.

13. The system of claim 1, wherein the magnet is a permanent magnet.

14. The system of claim 1, wherein the magnet is mounted to the rotatable member.

15. The system of claim 1, wherein the magnet is mounted to a non-rotatable member proximate the rotatable member.

16. The system of claim 1, wherein a minimum frequency of the electrical signal generated by the radio-frequency signal generator is greater than a maximum frequency of the coil current being induced within the inductive coil in response to the changes in the magnetic field caused by the rotation of the rotatable member.

17. The system of claim 16, wherein a ratio of the minimum frequency of the electrical signal generated by the radio-frequency signal generator to the maximum frequency of the coil current being induced within the inductive coil is greater than 10:1.

18. A method for a sensing rotation frequency of a rotatable member and for monitoring health thereof, the method comprising:
generating, via a magnet, a magnetic field proximate the rotatable member;
causing, via rotation of the rotatable member, changes in the magnetic field generated by the magnet;
positioning first and second inductive coils proximate the rotatable member so as to sense changes in the magnetic field;
inducing, via the changes in the magnetic field sensed, coil currents within each of the first and second inductive coils;
generating, in response to the coil currents induced, signals indicative of the rotation frequency of the rotatable member;
generating, via a radio-frequency signal generator coupled to the first inductive coil, an electrical signal that, when conducted by the the first inductive coil, radiatively transmits an electromagnetic signal;
receiving, via the second inductive coil, the electromagnetic signal radiatively transmitted by the first inductive coil; and
determining, via a speed-probe monitor and based on the electromagnetic signals received, health of each of the first and/or second inductive coils.

19. The method of claim 18, wherein each of the first and second inductive coils is configurable either as a transmitter or as a receiver.

20. The method of claim 18, further comprising:
sequentially configuring, via a sequence controller, each of the first and second inductive coils as the transmitter, and an other of the inductive coils as the receiver.

* * * * *